(12) United States Patent
Sivertsen et al.

(10) Patent No.: US 7,734,953 B1
(45) Date of Patent: Jun. 8, 2010

(54) REDUNDANT POWER SOLUTION FOR COMPUTER SYSTEM EXPANSION CARDS

(75) Inventors: Clas Gerhard Sivertsen, Lilburn, GA (US); Umasankar Mondal, Snellville, GA (US)

(73) Assignee: American Megatrends, Inc., Norcross, GA (US)

( * ) Notice: Subject to any disclaimer, the term of this patent is extended or adjusted under 35 U.S.C. 154(b) by 757 days.

(21) Appl. No.: 11/451,059

(22) Filed: Jun. 12, 2006

(51) Int. Cl.
*G06F 11/00* (2006.01)

(52) U.S. Cl. ........................................ 714/14
(58) Field of Classification Search .................. 714/14, 714/22; 713/300, 340
See application file for complete search history.

(56) References Cited

U.S. PATENT DOCUMENTS

| | | | | |
|---|---|---|---|---|
| 6,044,207 | A * | 3/2000 | Pecone et al. | 710/314 |
| 6,351,819 | B1 * | 2/2002 | Berglund et al. | 713/310 |
| 6,681,335 | B1 * | 1/2004 | Rice et al. | 713/320 |
| 7,024,569 | B1 * | 4/2006 | Wright et al. | 713/300 |
| 7,085,939 | B2 * | 8/2006 | Cabezas et al. | 713/300 |
| 7,482,711 | B2 * | 1/2009 | Blaha | 307/80 |
| 7,498,835 | B1 * | 3/2009 | Rahman et al. | 326/38 |
| 2003/0110244 | A1 * | 6/2003 | Mondal | 709/223 |
| 2005/0044447 | A1 * | 2/2005 | Dunstan | 714/14 |
| 2005/0046637 | A1 * | 3/2005 | Mondal | 345/547 |
| 2005/0047356 | A1 * | 3/2005 | Fujii et al. | 370/311 |
| 2005/0097372 | A1 * | 5/2005 | Ortiz et al. | 713/300 |
| 2006/0080515 | A1 * | 4/2006 | Spiers et al. | 711/162 |
| 2006/0101372 | A1 * | 5/2006 | Zhuo et al. | 717/100 |
| 2006/0221751 | A1 * | 10/2006 | Chiao et al. | 365/229 |

\* cited by examiner

*Primary Examiner*—Joshua A Lohn
(74) *Attorney, Agent, or Firm*—Hope Baldauff Hartmann

(57) ABSTRACT

Methods, systems, apparatus, and computer-readable media for providing a redundant power solution for an expansion card installed within a host computer. The expansion card has a hardware device and a power control mechanism. The power control mechanism provides power to the hardware device from a conditional power source when available, and from computer system standby power when the conditional power source is unavailable. The power control mechanism may comprise a power sensing mechanism to determine when conditional power source output decreases below a threshold level and a switching mechanism to switch from the conditional power source to computer system standby power when this happens. The hardware device may enter a low power mode upon receiving computer system standby power.

15 Claims, 4 Drawing Sheets

REDUNDANT POWER SOLUTION FOR COMPUTER SYSTEM EXPANSION CARDS

BACKGROUND

Computer systems are often upgraded by installing an expansion card into the host computer. Expansion cards are circuit boards that are plugged into a host computer's bus in order to add a desired set of functions to the computer. Expansion cards typically contain any number of hardware components and connect to the motherboard of the host computer via an expansion slot on the motherboard. An expansion card includes a bus connector that inserts into the expansion slot on the motherboard in order to electrically and communicatively connect the hardware components on the expansion card to the motherboard. The bus connector enables power and/or data to be transferred between the components on the expansion card and the motherboard. When the components of the expansion card utilize computer system power transferred via the bus connector, then these components will only be operational when the computer system is powered, unless an external wall power adapter is connected to the expansion card. This limitation restricts a user's ability to utilize an expansion card when a host computer system is powered down. This restriction is particularly problematic when the expansion card is a remote server management card used to control and monitor the host computer system.

It is with respect to these considerations and others that the various embodiments of the invention have been made.

SUMMARY

In accordance with present embodiments described herein, the above and other problems are solved by methods, apparatus, systems, and computer-readable media for providing a redundant power solution for expansion cards installed within a host computer. Through the embodiments, components of an expansion card operate on main computer system power when available, and in a low-power mode on standby computer system power when the main power is unavailable.

According to one implementation described herein, an apparatus provides redundant power solutions to an expansion card in a computer system. The expansion card has a hardware device and a power control mechanism. The power control mechanism provides power to the hardware device from a conditional power source when available, and from computer system standby power when the conditional power source is unavailable.

A "conditional" power source is any source of power that is not continuous. Because the main computer system power is interrupted when the computer system is powered down, the main computer system power is "conditional." The same applies to power from a wall power adapter since that power is interrupted when the adapter is removed. In contrast, when a computer system is powered down, the computer system maintains standby power to provide a minimal amount of power to certain components that require a continuous power source, such as a clock. Therefore, computer system standby power, and any combination of redundant power sources, are "unconditional" power sources. Similarly, "conditional" hardware components are not required to maintain any level of functionality upon the loss of power, "unconditional" hardware components require some level of full-time functionality, and therefore require a continuous power supply.

According to another implementation, an apparatus is provided for providing redundant power to a plurality of devices on a peripheral component interconnect ("PCI") expansion card. The apparatus has one or more conditionally powered devices that are connected to a first conditional power source. The first conditional power source may be 3.3V computer system power. The apparatus also has one or more unconditionally powered devices powered by either a second conditional power source or an unconditional power source. The second conditional power source may include 5V computer system power or a wall adapter power source and the unconditional power source may include 3.3V standby computer system power.

The apparatus has a power control mechanism for delivering power to the unconditionally powered devices from the second conditional power source if the second conditional power source is present or from the unconditional power source if the second conditional power source is not present. One or more of the unconditionally powered devices are operative to enter a low power mode while power is delivered from the unconditional power source. Entering a low power mode may include the processor deprogramming a field programmable gate array ("FPGA"), reducing the clock speed, and discontinuing any memory refreshes.

Yet another implementation includes a remote management card for providing redundant power solutions to computer management devices on the card. The remote management card includes a PCI bus connector that receives computer system power and standby computer system power from a local computer. One or more unconditionally powered devices on the remote management card, including a processor operative to interface a remote computer with the local computer, are powered by either a conditional power source or the standby computer system power. The remote management card has a power sensing mechanism for sensing when the computer system power is interrupted and a power control mechanism for delivering power to the unconditionally powered devices from the conditional power source if the conditional power source is present or from the standby computer system power if the conditional power source is not present when the computer system power is interrupted. One or more of the unconditionally powered devices are operative to enter a low power mode while power is delivered from the standby computer system power.

Aspects of the invention may also be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

Figure 1:
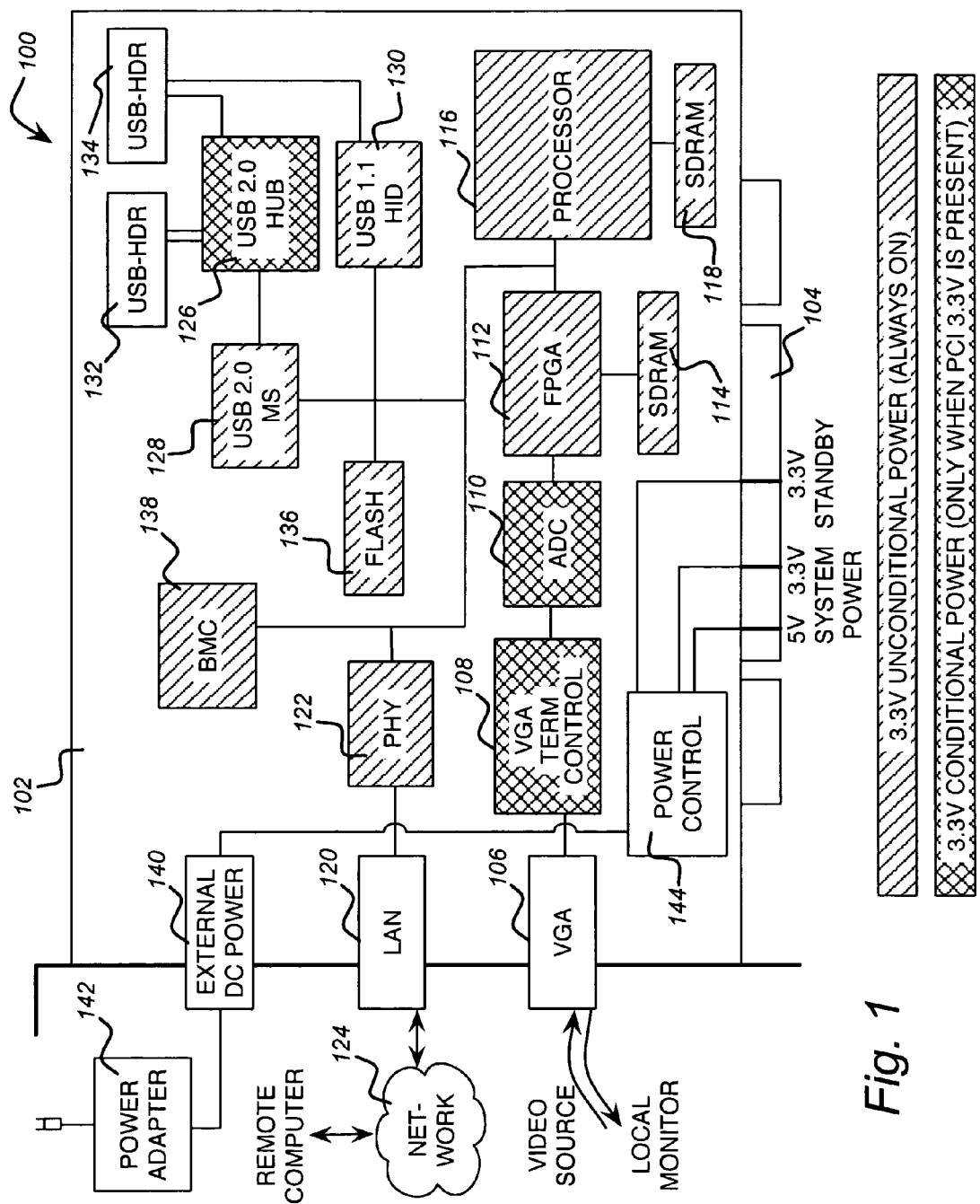
FIG. 1 is a block diagram illustrating the functional components of a remote management card according to one embodiment described herein.

Embodiments of the present invention provide methods, apparatus, systems, and computer-readable media for providing a redundant power solution for devices mounted on PCI expansion cards when installed within a computer system. In the following detailed description, references are made to the accompanying drawings that form a part hereof, and in which are shown by way of illustration specific embodiments or examples. The implementations described below may be utilized in any expansion card environment in which components on an expansion card receive power from the host computer system and in which it would be beneficial to continue operation of the expansion card upon the loss of power from the host computer system without the aid of an external wall power adapter. For clarity, the implementations will be described in the context of a remote server management PCI expansion card installed within a host computer system. Referring now to the drawings, in which like numerals represent like elements throughout the several figures, the exemplary operating environment and several illustrative implementations will be described.

Local computers may be managed remotely so that the system manager or other user need not be physically present with the local computer but instead views screen displays and interacts with the local computer through a remotely located computer. For example, the user can remotely view screen frames being produced by the local computer to determine whether the local computer has crashed or whether the local computer is executing a particular application. Additionally, the end user may operate a user input device of the remote computer such as a mouse or keyboard, and the user input is transferred to the local computer where it can be implemented.

Remote computer management may be enabled through the use of a remote server management card that is installed within a PCI expansion slot connector of a computer system to be managed or through the use of a remote server management device that is externally connected to a computer system to be managed. U.S. Pat. No. 6,825,846 describes a remote server management apparatus and is herein incorporated by reference in its entirety.

FIG. 1 illustrates the components of remote server management system 100 according to one embodiment described herein. The remote server management system 100 includes PCI expansion card 102, which has a PCI bus connector 104. The expansion card 102 receives 5V and 3.3V system power and 3.3V standby power via PCI bus connector 104 from the computer system in which the expansion card 102 is installed. According to the implementation shown in FIG. 1, the expansion card 102 utilizes the PCI bus connector 104 only to receive power from the computer system. Before describing the power control implementations that are the focus of this disclosure, a description of the components of a remote server management PCI expansion card 102 and their functionality will be beneficial.

All video and user-input data that is transferred between a remote computer and the local computer in the remote server management system 100 is transferred via external VGA connectors 106 and network interface device 120, as well as USB headers 132 and 134. VGA connector 106 is used to both receive video signals from the local computer being managed and to transmit video signals to a local monitor. A Y-cable such as the one disclosed in U.S. patent application Ser. No. 11/215,629, entitled, "System and Apparatus for Selectively Terminating a Video Signal Based on the Presence or Absence of a Terminating Device" filed on Aug. 30, 2005, may be used to direct video signals from the output of the local computer into the expansion card 102 and then out to a local monitor using the same VGA connector 106. Alternatively, separate video-in and video-out ports may be used on the expansion card 102. Video signals pass through VGA connector 106, through the VGA termination control 108, to the analog-to-digital converter ("ADC") 110. The converter 110 digitizes the video signal and outputs the digitized video signal to a frame grabber 112. Alternatively, a digital video signal is output from the local computer and provided directly to the frame grabber 112.

The frame grabber 206 may be implemented as a field programmable gate array ("FPGA") that has been programmed to take the portion of the digitized video signal corresponding to one screen frame and outputs that portion of the digitized signal as discrete screen frame data. The screen frame data is utilized to compute a difference between screen frame data of a current screen and a screen frame data of an immediately preceding screen frame. SDRAM 114 is utilized to maintain the previous screen frame data and the current screen frame data so that an exclusive OR ("XOR") Boolean operation may be performed upon the two sets of screen frame data to indicate where the changes have occurred between the two. The frame grabber 112 provides the screen frame data to a processing device 116 so that it may be transmitted to a remote computer. The screen frame data may be either the entire screen frame data of the most current screen frame grabbed from the digitized video signal, or may be the screen frame data making up the difference detected by the XOR operation described above. Providing only the screen frame data representing the difference between the current screen frame and the preceding screen frame results in less data being distributed over the network 124.

The processing device 116 interacts with the frame grabber 112 to access the screen frame data to be provided to a network interface device 120 via physical layer 122. The processing device 116 may be implemented in various ways discussed above, such as but not limited to the PowerPC® 405GPr general purpose reduced instruction set processor manufactured by AMCC®. The processing device 116 employs logic to package the screen frame data for transfer by the network device 120 via a particular protocol, such as TCP/IP. The processing device 116 interacts with SDRAM 118 to perform the processing operations including receiving the screen frame data and packaging the data for transfer by the network interface 120. The data is transferred from the transceiver of the network interface 120 via the network 124 to the appropriate IP address of the network interface of the remote computer.

Input signals from user input devices attached to the remote computer are transferred to the expansion card 102 over the network 124. The USB HUB 126 communicates with the processing device 116 to emulate a USB node for the local computer. USB mass storage and human interface device emulation occurs via input from the remote computer, through the network interface 120, through USB 2.0 MS 128 and USB 1.1 HID 130, and to the local computer via USB headers 132 and 134. The health of the local computer may be monitored and managed over the network 124 utilizing the baseboard management controller ("BMC") 138 in communication with the processor 116. The flash 136 stores the program that operates the expansion card. The flash 136 may also direct the operations described in FIGS. 5 and 6.

As described briefly above, the expansion card 102 receives 5V and 3.3V system power and 3.3V standby power via PCI bus connector 104 from the host computer system in which the expansion card 102 is installed. A power control mechanism 144 distributes power to the components of expansion card 102. The power control mechanism 144 will be described in detail below with respect to FIGS. 2-4. The expansion card 102 may alternatively be operated from DC power provided by an external wall power adapter 142. The power adapter 142 plugs into the external DC power jack 140. Power is transferred to the power control mechanism, where it is distributed to the applicable expansion card components.

When a host computer system is powered down, the main computer system power is interrupted. Discontinuing the main computer system power typically terminates the functionality of an installed remote server management PCI expansion card 102 since the power provided to the expansion card 102 from the 5V and 3.3V main system power is terminated. However, it is desirable to maintain some degree of minimal card functionality when the corresponding host computer system is powered down for the purposes of monitoring the host computer system and providing system boot control and USB mass storage emulation. One solution is to utilize a power adapter 142 plugged into a wall power source. Another solution is to provide a battery on the expansion card to be used as a back-up power source when main computer system power or a wall adapter is not available. However, batteries do not maintain a charge indefinitely and periodically require replacement.

Implementations described herein utilize 3.3V standby power provided by the host computer system in order to maintain partial functionality while the main system power is unavailable. While a host computer system provides uninterrupted 3.3V standby power, the standby power is typically limited to 400 mA. To provide complete remote server management functionality, the expansion card 102 requires more current than 400 mA. Therefore, running the expansion card 102 on standby power full time is not practical. In order to provide minimal functionality while consuming less than 400 mA, the expansion card senses a disruption in the main system power of the host computer, terminates the operation of a number of unnecessary components, switches the operational power source from the main system power to standby power, and places required components in a low power mode. This process will be described in detail below with respect to FIGS. 2-6.

FIG. 1 identifies the components that require 3.3 V unconditional, or "always on," power from the host computer. These components and the corresponding required power will be referred to as "unconditional" or "always on" since these components provide some level of operational capability with or without main system power and are therefore, always on. The always-on components include the FPGA 112, SDRAM 114, processor 116, SDRAM 118, LAN PHY 122, BMC 138, USB 2.0 MS 128, USB 1.1 HID 130, and flash memory 136. For clarity, patterns are used in FIG. 1 to illustrate how power is distributed from the power control mechanism 144 to the unconditional and conditional components of the PCI expansion card 102. To maintain some level of functionality, these components require unconditional power at all times, which is some level of continuous power, whether the source of the power is standby computer system power that is always available, or some combination of the main computer system power, power adapter 142, or other conditional power supply to create a redundant unconditional power source.

In contrast, conditional components are those components that operate on main host computer system power, but lose functionality as main system power is interrupted. Their operation is "conditional" upon main computer system power. The conditional components include VGA termination control 108, ADC 110, and USB 2.0 Hub 126. Because local video and USB input is not available when the computer system is powered down, these components providing video and USB redirection capabilities are not required when the main computer system power is unavailable. As shown in FIG. 1, 5V and 3.3V main computer system power and 3.3V standby computer system power are provided by the host computer system to the power control mechanism 144 via the PCI bus connector 104. The power control mechanism 144 will be described in detail below with respect to FIGS. 2-4. Additionally, external DC power is provided from power adapter 142 to the power control mechanism 144 via the external DC power jack 140. It should be noted that for the purposes of this discussion, a "conditional" power source is any source of power that is not continuous. Because the main computer system power is interrupted when the computer system is powered down, the main computer system power is "conditional." The same applies to power from a wall power adapter since that power is interrupted when the adapter is removed.

It should be appreciated that the implementations described herein are not limited to the specific unconditional and conditional components shown in FIG. 1. Any components, shown or not shown in FIG. 1 that may be required to perform minimal functions in the absence of main computer system power may be connected to the power control mechanism 144 in a manner that allows unconditional power to be distributed to them in the event that main system power is lost. It should also be understood that the implementations described herein are not limited to a remote server management card, but are also applicable to any computer system expansion card that receives main computer system power and standby computer system power.

Figure 2:
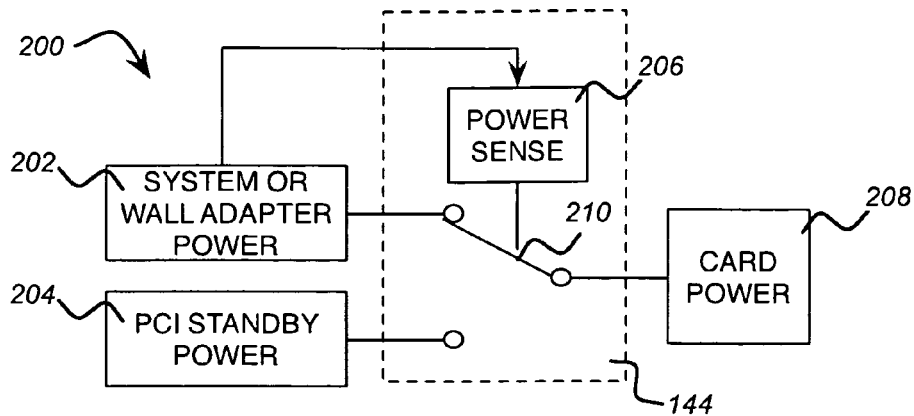
FIGS. 2 and 3 are block diagrams showing power sensing and power control mechanisms according to implementations described herein.
Figure 3:
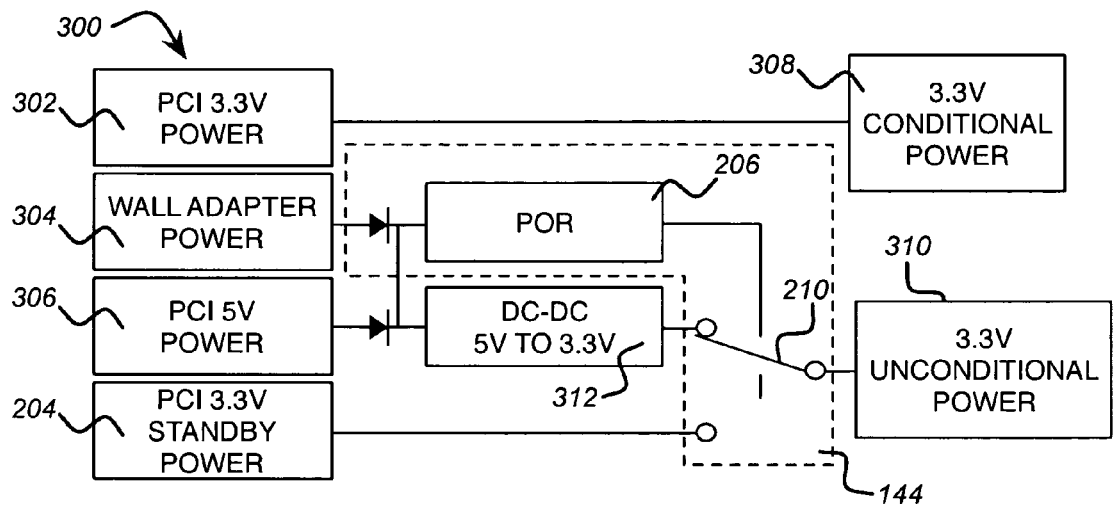

Turning now to FIG. 2, a simplified representation of redundant power system 200 is shown, including a power control mechanism 144 for providing a redundant power solution to the expansion card 102. The unconditional power that is provided to the always-on components of the expansion card 102 is provided by the conditional main computer system power or wall adapter power 202, or the unconditional PCI standby power 204. The power control mechanism 144 senses when the conditional power 202 becomes unavailable, and then switches the power supply from the unavailable conditional power 202 to the unconditional PCI standby power 204. The power control mechanism 144 includes a power-sensing component 206 and a switching mechanism 210. The power-sensing component 206 is electrically connected to the conditional power source 202 such that any power loss below a threshold will trigger the switching mechanism 210 to switch the power supply to PCI standby power 204. As will be discussed below with respect to FIGS. 3 and 4, the power-sensing mechanism 206 may be a power-on reset ("POR") circuit and the switching mechanism 210 may include field effect transistors ("FETs") used to switch between power sources.

FIG. 3 shows redundant power system 300 for providing a redundant power solution to the expansion card 102. The redundant power system 300 is similar to system 200 shown in FIG. 2, but is shown in greater detail. The conditional components of the expansion card 102 that are described above with respect to FIG. 1 are powered by 3.3V of conditional expansion card power 308. Conditional expansion card power 308 is provided to the card via the PCI bus connector 104 from the 3.3V main computer system power 302. When the computer system is powered down or the main computer system power is otherwise interrupted, then the conditional components of the expansion card 102 are no longer operational.

The 3.3V unconditional expansion card power 310 that is utilized to power the unconditional components of the expansion card 102 may originate from one of several sources, including a wall power adapter 304, 5V main computer system power 306 that is stepped down to 3.3V by a transformer 312, and PCI standby power 204. The power control mechanism 144 consists of a POR circuit 206 for sensing a power loss from the wall power adapter 304 or the main computer system power 306 and triggering the switching mechanism 210 to switch the power source to the PCI standby power 204. The power switching mechanism 210 may include multiple FETs as described below with respect to FIG. 4.

Figure 4:
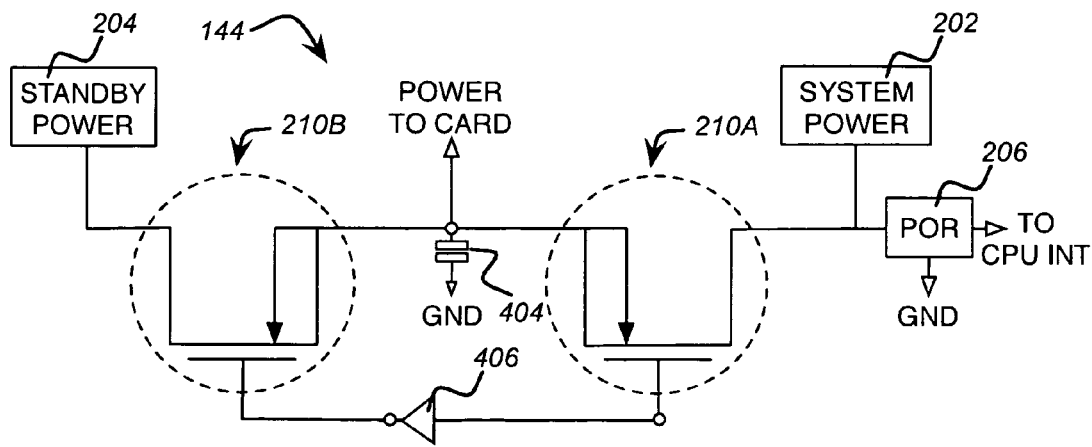
FIG. 4 is a circuit diagram illustrating a power sensing and power control mechanism according to one embodiment.

FIG. 4 illustrates a power control mechanism 144 according to one implementation described herein. Power control mechanism 144 is shown as a simplified circuit that delivers unconditional power to the PCI expansion card 102. The circuit receives system power 202, which is monitored by the POR 206. The POR 206 is connected to a CPU interrupt, which triggers the inverter 406 when the POR detects a decrease in the system power 202 below a threshold level. The inverter 406 activates the gate at FET 210A, discontinuing the current flow through this transistor, which effectively acts as a switch.

Once the current flow ceases through FET 210A, the gate at FET 210B activates, allowing for current to flow from the standby power source 204 to the expansion card 102, via the FET 210B. A capacitor 404 maintains the required power to the expansion card 102 during transition between system power 202 and standby power 204. It should be understood to those with skill in the art that the power control mechanism 144 may be created without the use of FETs, providing that the electrical circuit effectively senses a power loss in the main system power and switches the power source to a standby power source. Once operating on standby power, the unconditional components of expansion card 102 may enter a low power mode. This process will be described in detail below with respect to FIG. 6.

Figure 5:
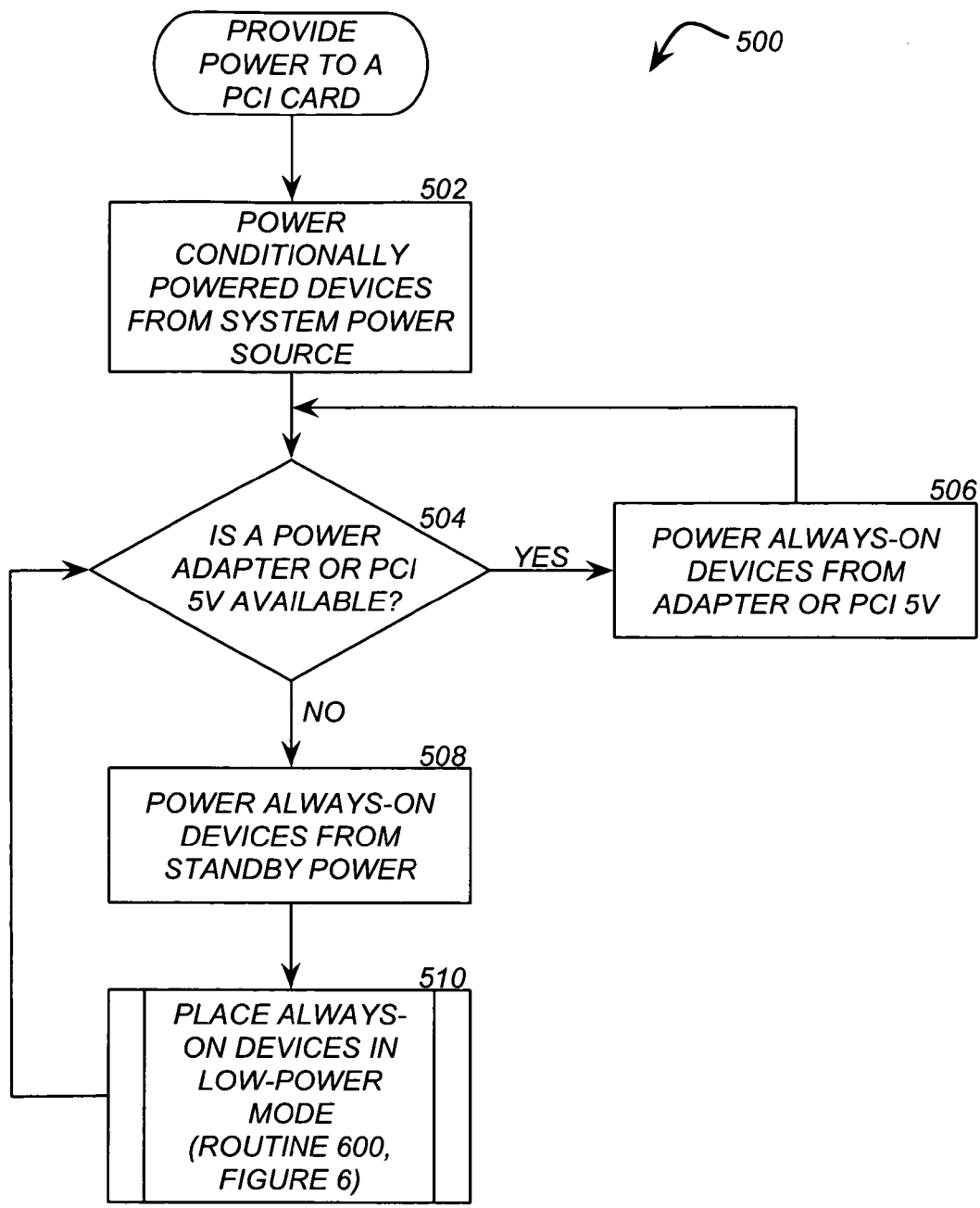
FIG. 5 illustrates a flow diagram showing a process for providing power to a PCI expansion card according to one embodiment.

Turning now to FIG. 5, an illustrative routine 500 will be described in detail for providing power to a PCI expansion card. The logical operations of the various embodiments disclosed herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the embodiments described herein. Accordingly, the logical operations making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 500 begins at operation 502, where power is provided to conditionally powered devices from a system power source. At operation 504, a determination is made as to whether a power adapter 304 or PCI 5V power 306 is available. If a power adapter 304 or PCI 5V power 306 is available, then the routine 500 continues to operation 506, where the always-on devices are powered from the power adapter or PCI 5V power that has been stepped down to 3.3V. The routine 500 then returns from operation 506 to operation 504 and continues as described. If at operation 504 it is determined that a power adapter 304 or PCI 5V power 306 is not available, then the routine 500 continues to operation 508, where the always-on devices are powered from PCI standby power 204. The routine continues from operation 508 to operation 510, where the always-on devices are placed in a low power mode. The routine 500 then returns to operation 504 and continues as described above.

Figure 6:
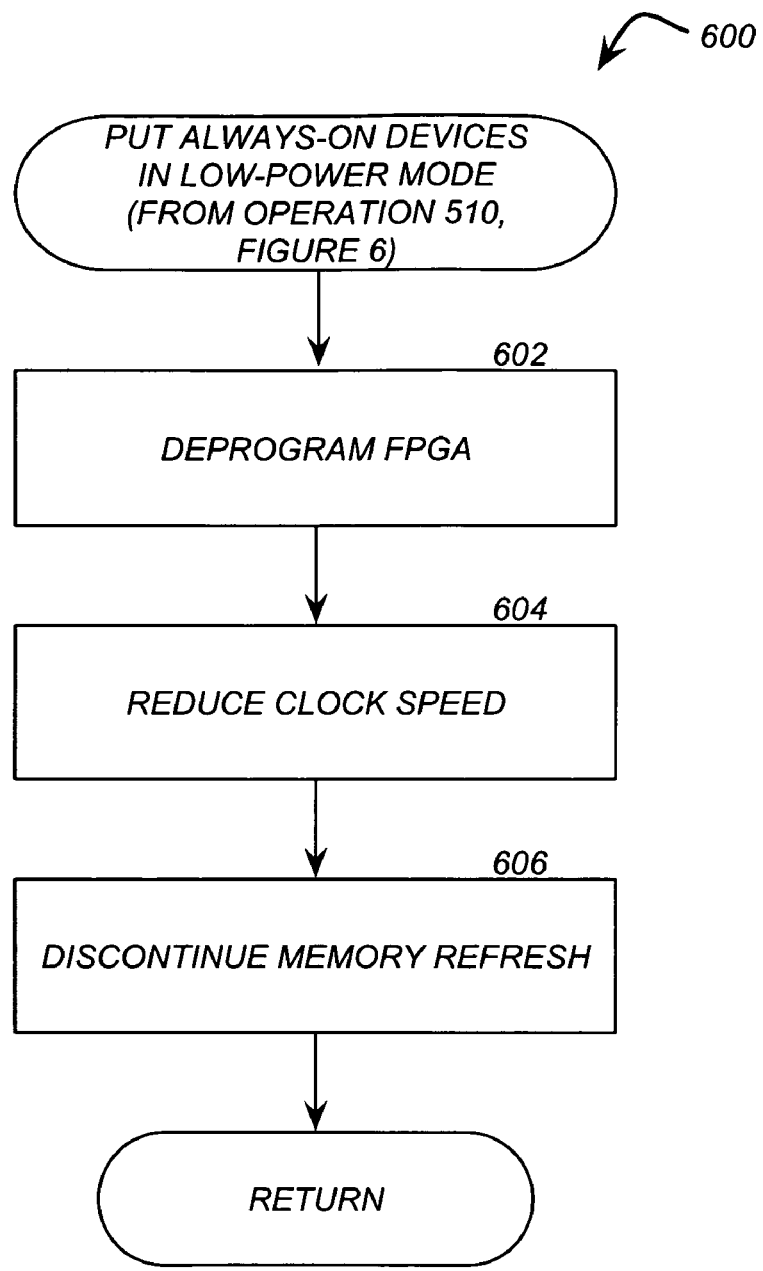
FIG. 6 illustrates a flow diagram showing a subroutine from FIG. 5 for placing always-on devices in a low power mode according to one embodiment.

FIG. 6 describes operation 600 as a subroutine, where the always-on devices are placed in a low power mode, in greater detail. Subroutine 600 begins at operation 602, where the FPGA is deprogrammed. Because video signals are not received while the host computer system is powered down, then there is no need for the video capture and redirection circuitry to be fully operational and consuming full power. The FPGA operates on very little power until programmed. For this reason, the FPGA may be deprogrammed when the main system power is lost for the purpose of saving power.

From operation 602, the subroutine 600 continues to operation 604, where the clock speed is reduced. The subroutine 600 continues to operation 606, where any memory refresh functions are discontinued, and then the subroutine ends. It should be understood that these power saving procedures are not limited to the components, operations, and sequence described in FIG. 6. Depending on the type of components on the expansion card 102, the desired always-on components must not consume more than 400 mA or the amount of current available when the host system is operating on standby power.

It should be appreciated that embodiments described herein provide methods, apparatus, systems, and computer-readable media for providing a redundant power solution to a PCI expansion card installed within a host computer system. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. An apparatus for providing power to a remote server management expansion card in a computer system, comprising:
   a hardware device mounted on the remote server management expansion card configured to manage a plurality of remotely located computer systems;
   a power control mechanism configured to provide power to the hardware device from a conditional power source when the conditional power source is available, and to provide computer system standby power to the hardware device when the conditional power source is unavailable;

the power control mechanism comprising a power sensing component comprising a power-on reset circuit configured to sense whether the conditional power source is available, and a switching mechanism configured to be triggered by the power-on reset circuit to switch the power being provided to the hardware device from the conditional power source to the computer system standby power when the power-on reset circuit senses that the conditional power source is not available, such that the hardware device enters a low power mode;

a processor configured to instruct the hardware device to enter the low power mode when receiving computer system standby power; and an energy storage component configured to provide power to the hardware device when both the conditional power source and the unconditional power source are unavailable.

2. The apparatus of claim 1, further comprising a second hardware device, and wherein the power control mechanism is further configured to provide power to the second hardware device from the conditional power source such that the second hardware device is powered down upon a loss of the conditional power source.

3. The apparatus of claim 1, wherein the conditional power source comprises either an external power source independent from the computer system power or computer system power received through a bus connector of the expansion card.

4. The apparatus of claim 1, wherein the power-on reset circuit is connected to a computer interrupt and is further configured to determine if the power from the conditional power source decreases beyond a threshold, and if the power does decrease beyond the threshold, the computer interrupt triggers the switching mechanism to switch between power sources.

5. The apparatus of claim 4, wherein the switching mechanism comprises an inverter and a plurality of field-effect transistors ("FETs"), the inverter is configured to be triggered by the computer interrupt when the power-on reset circuit determines that the power from the conditional power source decreases beyond the threshold, and the inverter is further configured to activate a gate of one of the FETs to prevent current flow from the conditional power source and to allow current flow from the computer system standby power.

6. The apparatus of claim 1, wherein the hardware device comprises a field programmable gate array ("FPGA") and wherein entering a low power mode comprises deprogramming the FPGA.

7. The apparatus of claim 1, wherein the expansion card comprises a peripheral component interconnect ("PCI") card, wherein the conditional power source comprises main computer system power received via a PCI bus connector of the PCI card, and wherein the computer system standby power is received via the PCI bus connector.

8. An apparatus for providing redundant power to a plurality of devices on a PCI expansion card, comprising:
one or more conditionally powered devices connected to a first conditional power source, wherein the one or more conditionally powered devices comprises a conditional video converter configured to convert an analog video signal from an analog video signal to a digitized video signal and to output a digitized video signal to one or more unconditionally powered devices;
the one or more unconditionally powered devices powered by either a second conditional power source or an unconditional power source, wherein the one or more unconditionally powered devices comprises a frame grabber being programmed to take a portion of the digitized video signal corresponding to one screen frame and to output that portion of the digitized video signal as discrete screen frame data utilized to compute a difference between screen frame data of a current screen and a screen frame data of an immediately preceding screen frame;
a power control mechanism for delivering power to the one or more unconditionally powered devices from the second conditional power source if the second conditional power source is present or from the unconditional power source if the second conditional power source is not present; and
a processor configured to instruct the one or more unconditionally powered devices to enter a low power mode when the one or more unconditionally powered devices are powered by the unconditional power source.

9. The apparatus of claim 8, wherein the first conditional power source comprises 3.3V computer system power received at a PCI bus connector of the PCI expansion card, wherein the second conditional power source comprises an external power source received independently from the PCI bus connector or 5V computer system power received through the PCI bus connector and converted to 3.3V, and wherein the unconditional power source comprises 3.3V standby computer system power received at the PCI bus connector.

10. The apparatus of claim 8, wherein the power sensing mechanism comprises a power-on reset circuit connected to a computer interrupt that triggers a power switching mechanism when the power-on reset circuit determines that the power is below a threshold, and wherein the power control mechanism comprises two identical FETs.

11. The apparatus of claim 8, wherein the one or more unconditionally powered devices further comprises a FPGA, a LAN physical layer, and a USB device.

12. The apparatus of claim 11, wherein the processor being further configured to deprogram the FPGA, reduce a clock speed, and discontinue any memory refreshes when the one or more unconditionally powered devices are powered by the unconditional power source.

13. A remote management card for providing redundant power solutions to computer management devices on the card, comprising:
a PCI bus connector receiving computer system power and standby computer system power from a local computer;
one or more unconditionally powered devices powered by either a conditional power source or the standby computer system power, wherein the one or more unconditionally powered devices comprises a FPGA, a LAN physical layer, a USB device and a processor configured to interface a remote computer with the local computer;
a power sensing mechanism for sensing when the computer system power is interrupted, wherein the power sensing mechanism comprises a power-on reset circuit configured to 1) sense a power loss from the conditional power source and to 2) trigger a switching mechanism to switch the power source to the standby computer system power, and wherein the power-on reset circuit is connected to a computer interrupt configured to trigger the switching mechanism when the power-on reset detects a decrease in the computer system power below a threshold;
a power control mechanism for delivering power to the unconditionally powered devices from the conditional power source if the conditional power source is present or from the standby computer system power if the conditional power source is not present when the computer system power is interrupted;

an energy storage component configured to provide power to the unconditionally powered devices when both the conditional power source and the standby computer system power source are not present; and wherein one or more of the unconditionally powered devices are configured to enter a low power mode by deprogramming the FPGA, reducing a clock speed, and discontinuing any memory refreshes while power is delivered from the standby computer system power.

14. The remote management card of claim 13, wherein the computer system power comprises 3.3V and wherein the conditional power source comprises an AC wall adapter or 5V computer system power received through the PCI bus connector of the remote management card and converted to 3.3V.

15. The remote management card of claim 11, wherein the power control mechanism comprises two identical FETs.

* * * * *